(12) United States Patent
Lundin, Jr.

(10) Patent No.: US 11,653,630 B2
(45) Date of Patent: May 23, 2023

(54) GAS AND LIQUID SUPPLY SYSTEM

(71) Applicant: Craig William Lundin, Jr., St. Louis, MO (US)

(72) Inventor: Craig William Lundin, Jr., St. Louis, MO (US)

( * ) Notice: Subject to any disclaimer, the term of this patent is extended or adjusted under 35 U.S.C. 154(b) by 235 days.

(21) Appl. No.: 17/118,518

(22) Filed: Dec. 10, 2020

(65) Prior Publication Data

US 2021/0169045 A1    Jun. 10, 2021

Related U.S. Application Data

(60) Provisional application No. 62/946,099, filed on Dec. 10, 2019.

(51) Int. Cl.
*A01K 13/00* (2006.01)
*A47L 23/20* (2006.01)

(52) U.S. Cl.
CPC .......... *A01K 13/001* (2013.01); *A47L 23/20* (2013.01)

(58) Field of Classification Search
CPC ........ A61D 7/00; A61D 11/00; A01K 13/001; A01K 13/00
See application file for complete search history.

(56) References Cited

U.S. PATENT DOCUMENTS

| | | | |
|---|---|---|---|
| 4,938,469 A * | 7/1990 | Crandell | A63B 22/025 4/492 |
| 5,007,182 A * | 4/1991 | Fishman | A47K 10/48 34/523 |
| 5,435,269 A * | 7/1995 | Chen | A01K 13/001 119/668 |
| 5,930,912 A * | 8/1999 | Carder | A47K 10/48 34/90 |
| 6,393,717 B1 * | 5/2002 | Santos | A47K 10/48 34/232 |
| 6,553,935 B1 * | 4/2003 | Penner | A01K 1/035 119/28.5 |
| 6,688,257 B2 * | 2/2004 | Lee | A01K 13/001 119/668 |
| 6,705,023 B1 * | 3/2004 | Hoover | A47K 10/48 392/382 |
| 8,882,387 B2 * | 11/2014 | Takano | E01C 11/26 404/71 |
| 9,756,952 B2 * | 9/2017 | Alletto, Jr. | A61G 7/05784 |
| 10,051,837 B2 * | 8/2018 | Hickman | A01K 13/001 |
| 11,317,605 B2 * | 5/2022 | Im | A47K 10/48 |
| 11,357,209 B2 * | 6/2022 | Marshall, III | A01K 1/035 |
| 2006/0169219 A1 * | 8/2006 | Yaghmai | A01K 13/001 119/651 |
| 2009/0173286 A1 * | 7/2009 | Schetlin | A01K 13/001 119/606 |
| 2018/0078113 A1 * | 3/2018 | Nurlybekov | A47L 23/205 |

FOREIGN PATENT DOCUMENTS

| | | | | |
|---|---|---|---|---|
| CN | 110151356 A | * | 8/2019 | ............ A61D 11/00 |
| KR | 200346855 Y1 | * | 4/2004 | ............ A01K 13/001 |

* cited by examiner

*Primary Examiner* — Ebony E Evans
(74) *Attorney, Agent, or Firm* — Stinson LLP

(57) ABSTRACT

The present invention relates to fluid moving devices (gas, liquid, or combination thereof). For example, particular devices of the present invention include drying devices, pumps, engines, motors, fans, and diffusers. Devices of the present invention also include display of mechanical movements for ornamental and practical purposes such as clock, model, or toy.

16 Claims, 19 Drawing Sheets

GAS AND LIQUID SUPPLY SYSTEM

CROSS-REFERENCE TO RELATED APPLICATIONS

This application claims the benefit of U.S. Provisional Application No. 62/946,099, filed Dec. 10, 2019, the contents of which are hereby incorporated herein by reference.

FIELD OF THE INVENTION

The present invention relates to fluid moving devices (gas, liquid, or combination thereof). For example, particular devices of the present invention include drying devices, pumps, engines, motors, fans, and diffusers. Devices of the present invention also include display of mechanical movements for ornamental and practical purposes such as clock, model, or toy.

BACKGROUND OF THE INVENTION

Many applications require directional movement or flow of a gas or liquid. Conventional devices include pumps, motors, and fans. These types of devices generally use components operating at a high speed (e.g., high RPMs) to generate sufficient force or pressure to move a fluid. However, in some instances, fast moving mechanical components are not desirable or safe for the intended use of the device.

For example, there is a need for drying devices, especially for devices for drying objects or animals upon entry into a house, that do not expose the object or pet to fast spinning fan blades. Also, an advantageous drying device would be small and portable and configured like a floor mat (e.g., positioned low to the ground). However, comparable devices often include electrical components throughout the structure which can short circuit when contacted by wet objects.

Accordingly, there is a need for alternative devices that avoid one or more problems with prior designs. In particular, there is a need for relatively thin or low-to-the ground drying device capable of efficiently drying objects placed upon it.

BRIEF SUMMARY OF THE INVENTION

Aspects of the present invention are directed to devices comprising: a base comprising a central rotating disc that is functionally connected to a motor configured to rotate the disc, wherein the rotating disc is connected to the base by a vertical pin affixed to the base and positioned in the center of the central rotating disc; one or more rotatable discs connected to the base by a vertical pin and positioned in the center of the one or more rotatable discs; an upper tray comprising one or more upper rotating, wherein the one or more upper rotating discs are connected to the upper tray by a vertical pin affixed to the upper tray and positioned in the center of the disc; and a pin affixed to each of the one or more rotatable discs connected to the base and affixed to the one or more upper rotating discs connected to the upper tray, wherein the pin is positioned offset from center.

Various aspects of the present invention are directed to drying devices for objects such as articles of clothing, shoes, socks or animals (e.g., household pets). In various embodiments, the devices comprise (a) a hollow tray comprising an upper surface having a plurality of holes, a lower surface connected to a plurality of rotatable discs; wherein at least one disc is functionally connected to a motor configured to rotate the disc and, by extension, the hollow tray; (b) a plurality of hollow conduits spaced around the perimeter of the hollow tray, each conduit encasing a piston head connected to a piston rod secured to a bottom tray, the pistons freely moveable within the conduit and configured to push air through the hollow conduits and into the center of the hollow tray during rotation of the hollow tray; c) a stationary platform having a plurality of small holes positioned over the hollow tray; and d) housing that encases the components of (a) and (b) and suspends the stationary platform above the hollow tray.

Other objects and features will be in part apparent and in part pointed out hereinafter.

BRIEF DESCRIPTION OF THE SEVERAL VIEWS OF THE DRAWINGS

Corresponding reference characters indicate corresponding parts throughout the drawings.

DETAILED DESCRIPTION OF THE INVENTION

In various aspects, the present invention is directed to devices comprising: a base comprising a central rotating disc that is functionally connected to a motor configured to rotate the disc, wherein the rotating disc is connected to the base by a vertical pin affixed to the base and positioned in the center of the central rotating disc; one or more rotatable discs connected to the base by a vertical pin and positioned in the center of the one or more rotatable discs; an upper tray comprising one or more upper rotating, wherein the one or more upper rotating discs are connected to the upper tray by a vertical pin affixed to the upper tray and positioned in the center of the disc; and a pin affixed to each of the one or more rotatable discs connected to the base and affixed to the one or more upper rotating discs connected to the upper tray, wherein the pin is positioned offset from center.

In some embodiments, the present invention is directed to various drying devices useful for drying, among other things, objects or animals. In particular, various aspects of the invention relate to a floor mat like device where objects or animals may be placed. In various embodiments, the drying device, and components thereof, are described as illustrated in the attached Figures. Note that the embodiments as illustrated in the Figures, are meant to be illustrative and not limiting in any sense.

In various embodiments, the drying device comprises (a) a hollow tray comprising an upper surface having a plurality of holes, a lower surface connected to a plurality of rotatable discs; wherein at least one disc is functionally connected to a motor configured to rotate the disc (e.g., via belt, chain, drive shaft, or gear(s)) and by extension the hollow tray; (b) a plurality of hollow conduits spaced around the perimeter of the hollow tray, each conduit partially encasing a piston head connected to a piston rod secured to a bottom tray, the pistons freely moveable within the conduit and configured to push air through the hollow conduits and into the center of the hollow tray during rotation of the hollow tray; (c) a stationary platform having a plurality of small holes positioned over the hollow tray; and (d) housing that encases the components of (a) and (b) and suspends the stationary platform of (c) above the hollow tray.

Additional aspects of the invention may be determined from the drawings and description below.

Figure 1:
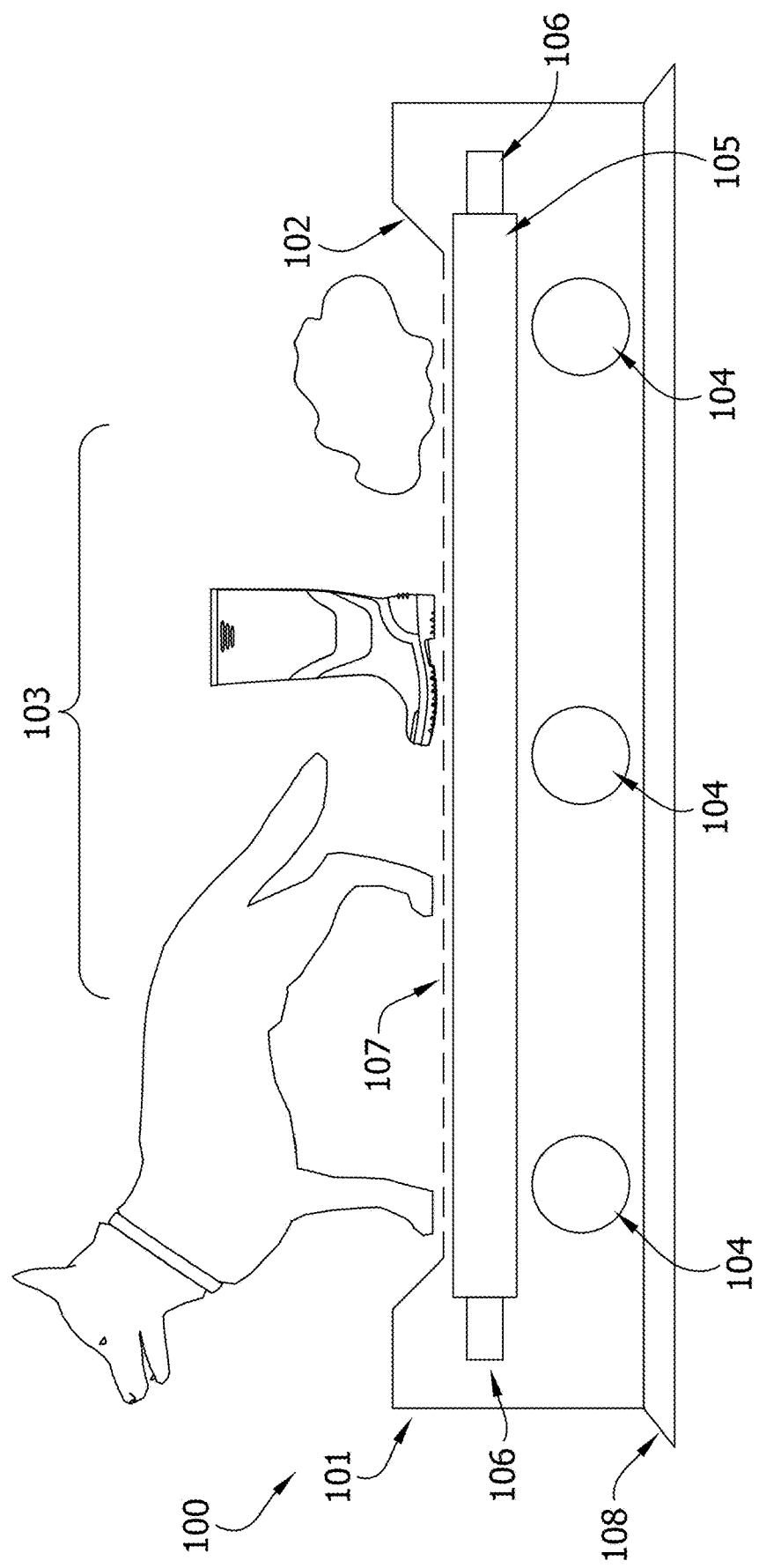
FIG. 1 is diagram of a system according to one embodiment of the invention illustrating, schematically, a drying device incorporating the components described herein.

Turning to FIG. 1, which provides a cross-sectional view of an illustrative embodiment of the present invention, the drying device (100) can comprise a housing (101) which optionally may be structured to have a screened area (102) configured to collect moisture and debris from the drying object(s) (103). In various embodiments, the drying device may comprise rotatable discs or bearings (104) positioned below a hollow tray (105). The hollow tray (105) is connected to hollow conduits (106) which house pistons (not shown) that facilitate air flow. The hollow tray itself is suspended inside the housing and spaced from exterior walls to allow for sufficient room to rotate on a horizontal plane. A grate or stationary platform (107) may be suspended over the housing and drying objects (103) may be placed upon it. In further embodiments, a high-friction material (108) may be affixed to the bottom surface of the housing (101), or the bottom of the housing compartment may comprise this high-friction material. This can ensure that the drying device is stabilized during operation.

Figure 2:
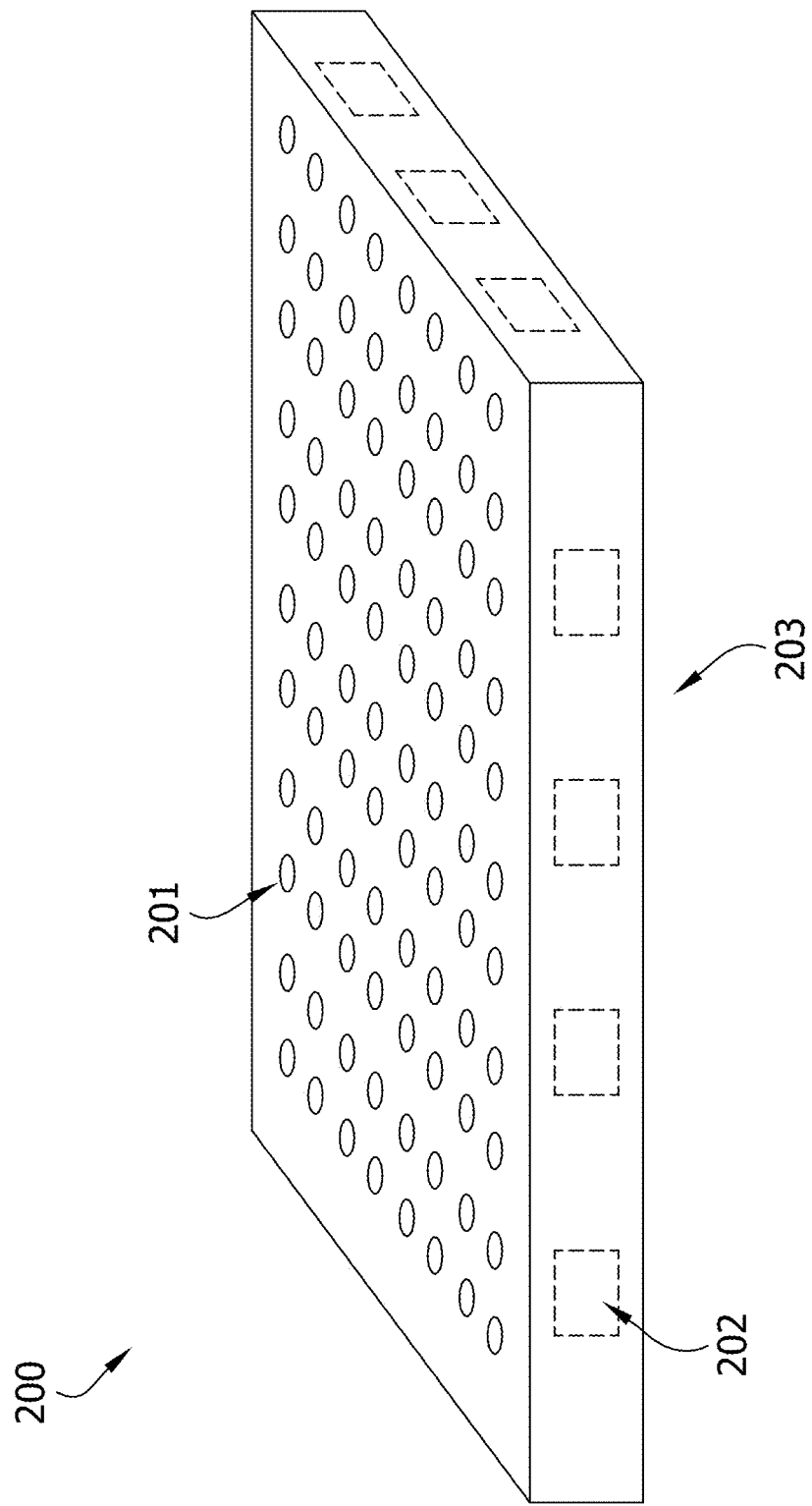
FIG. 2 is a schematic diagram of a hollow tray.
Figure 3:
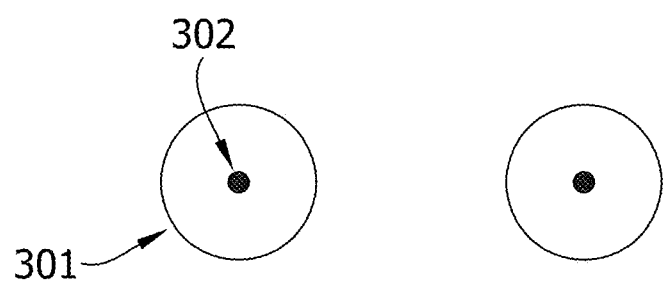
FIG. 3 is a schematic diagram of rotating discs as viewed from above.
Figure 3:
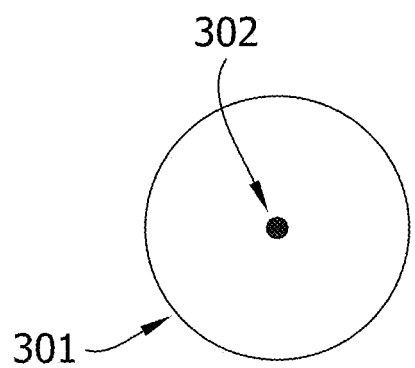
Figure 3:
Figure 4:
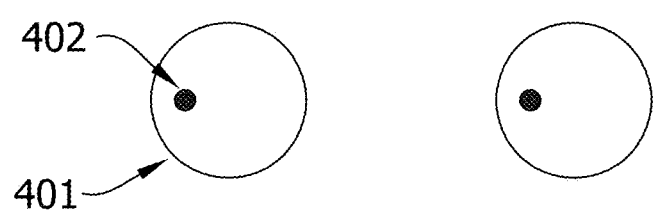
FIG. 4 is a schematic diagram of rotating discs as viewed from below.
Figure 4:
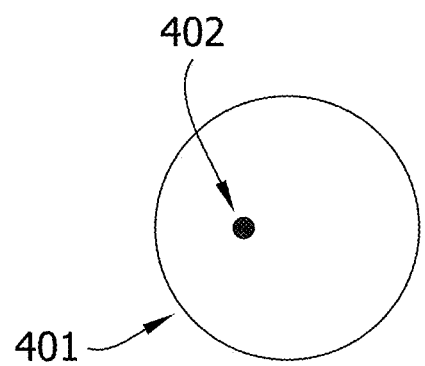
Figure 4:

As noted above, the drying device comprises a hollow tray that rotates via the rotation of a plurality of rotating discs or bearings. FIG. 2 provides an illustration of the hollow tray (200) comprising a top surface having a plurality of small holes (201) to direct produced air upwards towards the objects to be dried. The air is produced via a system of hollow conduits and pistons that connect with the hollow tray via openings (202) around the perimeter. Note that the openings may be any shape to securely fit the hollow conduits/pistons discussed below and are represented as squares for illustrative purposes only. The hollow tray is further connected to an arrangement of rotating discs on its bottom side (203). Turning to FIG. 3, an illustrative arrangement of these discs is provided. In FIG. 3 the bottom of the discs is shown. Each disc (301) has a hole (302) which can be positioned onto a vertical stud on the base of the housing compartment (not shown). Preferably, the post is freely rotatable in the hole (302) of the disc. Turning to FIG. 4, the topside of the rotating discs is shown. Each rotating disc (401) has a second hole or cavity (402) that are offset the holes facing down in FIG. 3. These holes are connected to the hollow tray (not shown) via studs (not shown). Preferably, the studs are affixed to the rotating disc such that the hollow tray and rotating discs move synchronously in a circular direction.

Figure 5:
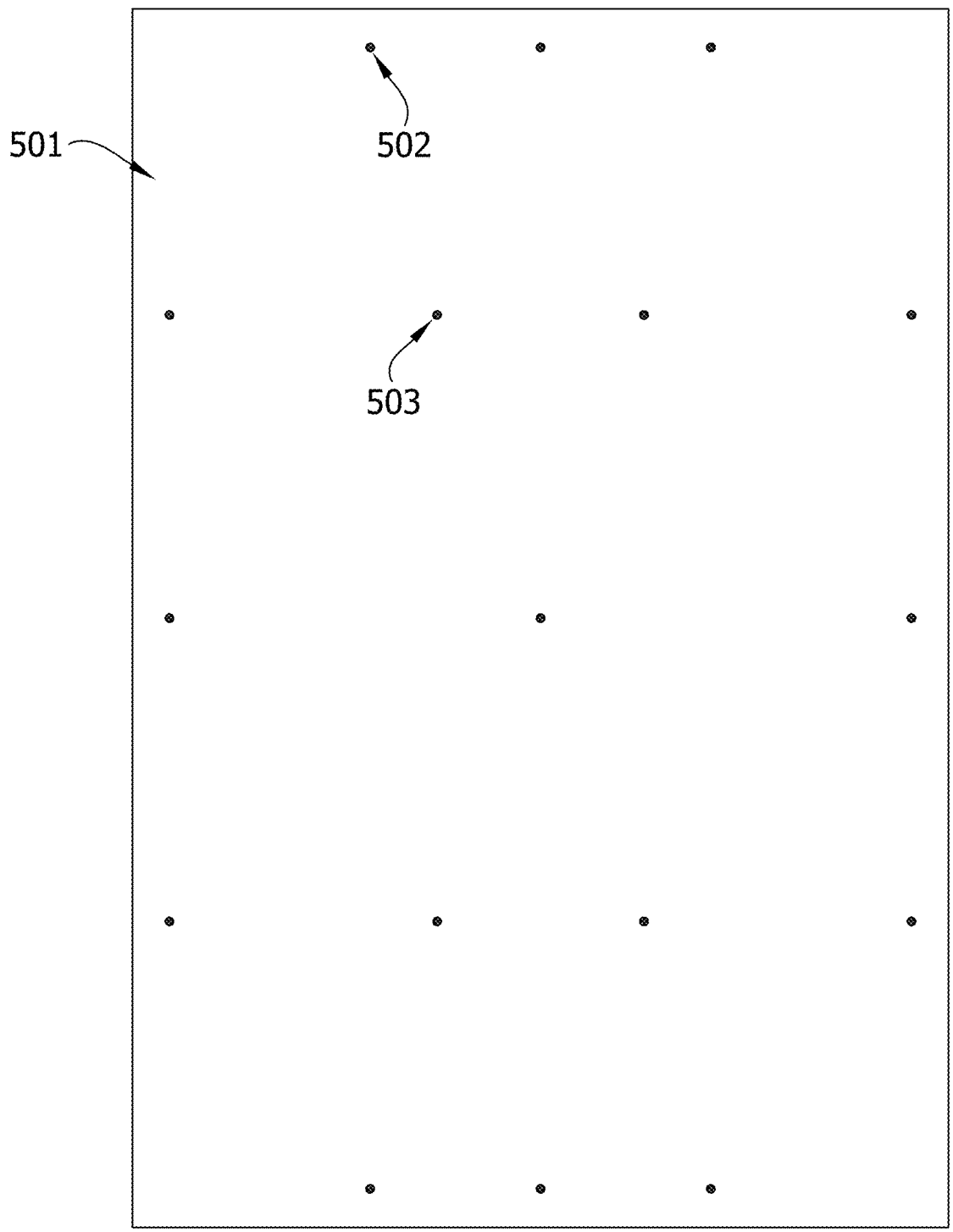
FIG. 5 is a schematic diagram of a base of a drying device according to an embodiment of the invention.
Figure 6:
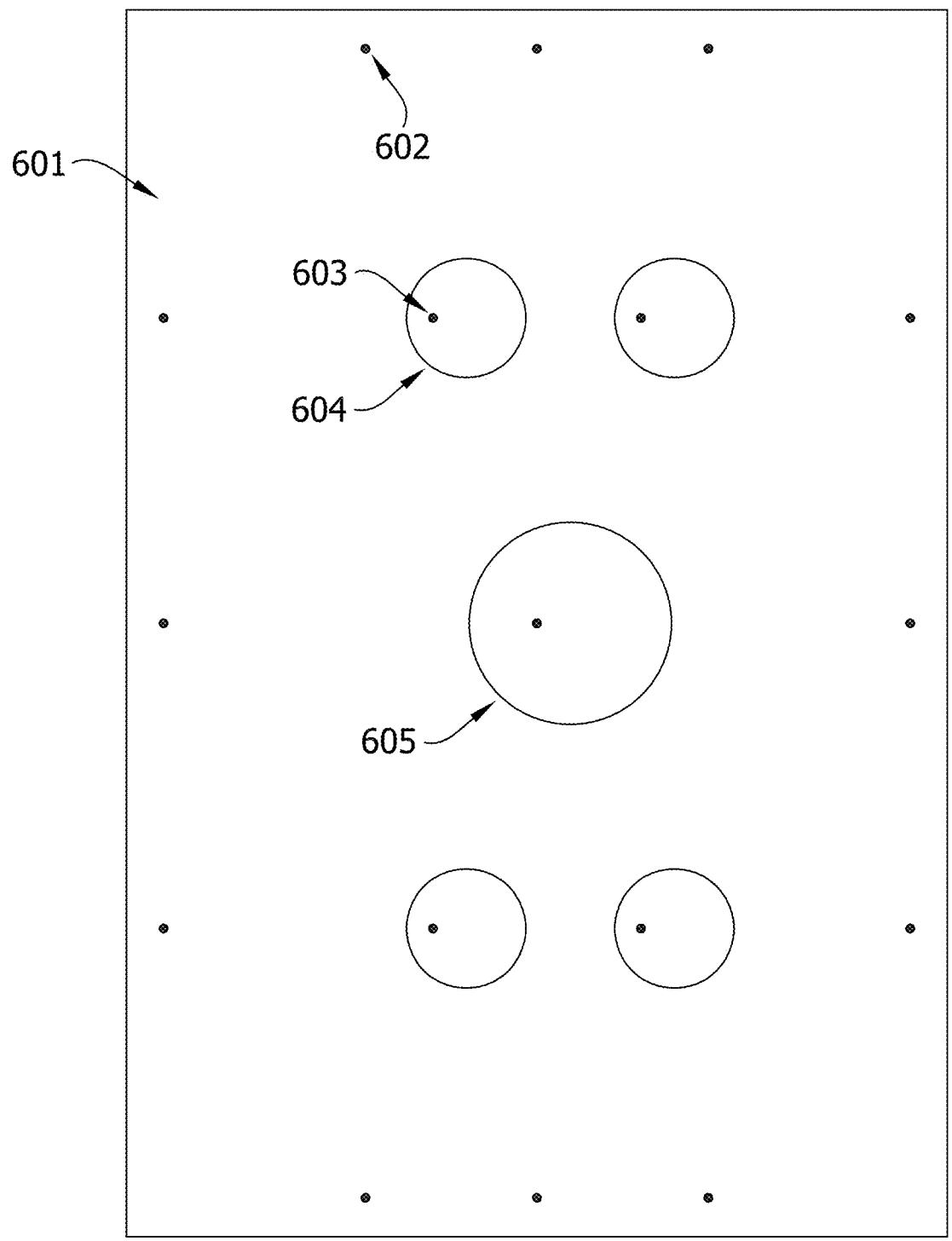
FIG. 6 is a schematic diagram of a base of a drying device with rotating discs positioned upon it, according to an embodiment of the invention.

As shown in FIG. 1, the rotating discs are positioned between the hollow tray and the base of the housing compartment. FIGS. 5 and 6 depict the base of the housing compartment as viewed from above (that is, looking down onto the base of the housing compartment) either without (FIG. 5) or with (FIG. 6) the upper rotating discs (604) and upper central rotating disc (605) discussed above. The base (501 and 601) of the housing compartment is connected to a plurality of studs which are positioned around the perimeter of the base (502 and 602) or are positioned in the interior (503 and 603). The perimeter studs (502 and 602) are connected to a plurality of pistons which are partially enclosed by the hollow conduits that surround the hollow tray (see, 106 in FIG. 1). The interior studs/pins (503 and 603) connect to the holes on the underside of the rotating discs (see 302 in FIG. 3) thereby anchoring or connecting the rotating discs to the bottom of the housing compartment.

Figure 7:
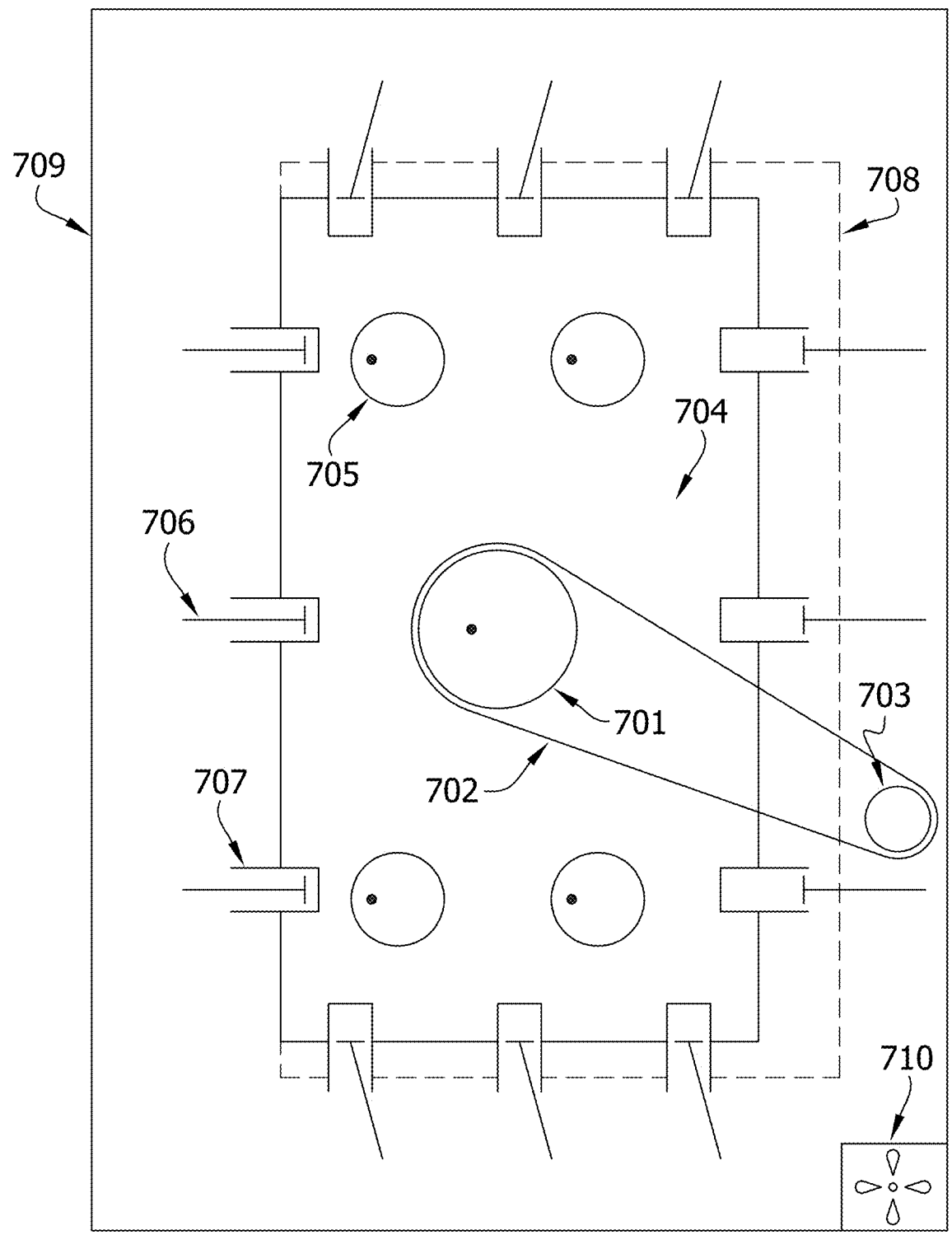
FIG. 7 is schematic of the moveable components of the invention arrayed on the base depicted in FIGS. 5-6.

Turning to FIG. 7, the central rotating disc (701) can be rotated via a belt or driveshaft (702) by a motor (703). This motion rotates the remaining discs (705) which are connected (e.g., via pin in offset hole in disc) to the hollow platform (704), thereby rotating the hollow platform. The motor comprises a rotor (i.e., a rotating component of the motor) directly connected to the central rotating disc. In various embodiments, the diameter of the rotor is less than the diameter of the central rotating disc. In various embodiments, the diameter of the motor (or rotating component thereof) is larger than the diameter of the central rotating disc. The movement of the hollow platform moves a plurality of pistons (706) partially enclosed in hollow conduits (707) positioned around the perimeter of the hollow tray. The movement of the pistons, as will be discussed below, facilitates air flow into the hollow tray. In some embodiments, a fan (710) may be added to the device to augment air flow mediated by the pistons. As noted above, the hollow tray is positioned in a housing, depicted in FIG. 7 as 709. The housing may further comprise an opening (708) above the hollow tray where a stationary platform is placed to position an object to be dried.

Figure 8:
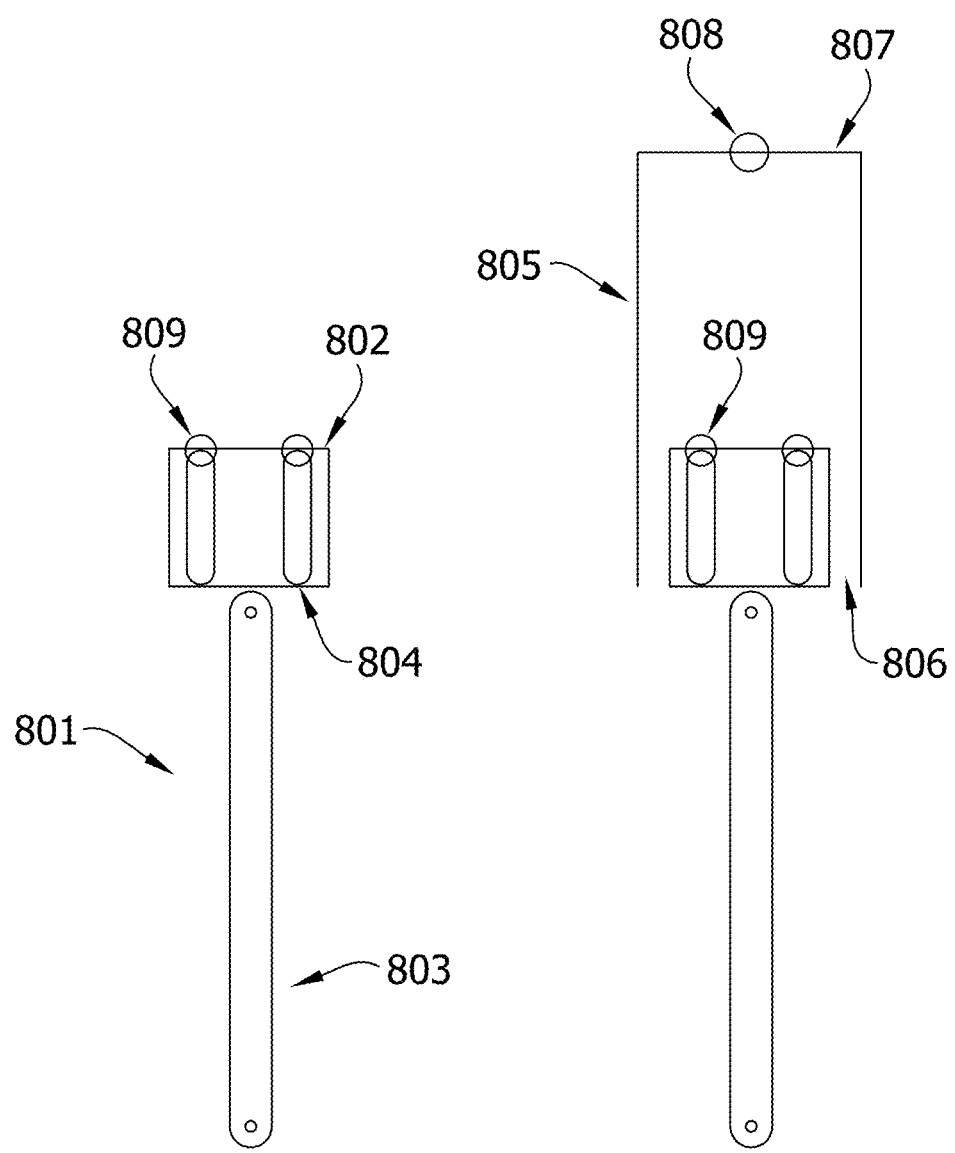
FIG. 8 is a schematic of the pistons and the hollow conduits of the drying device.
Figure 9:
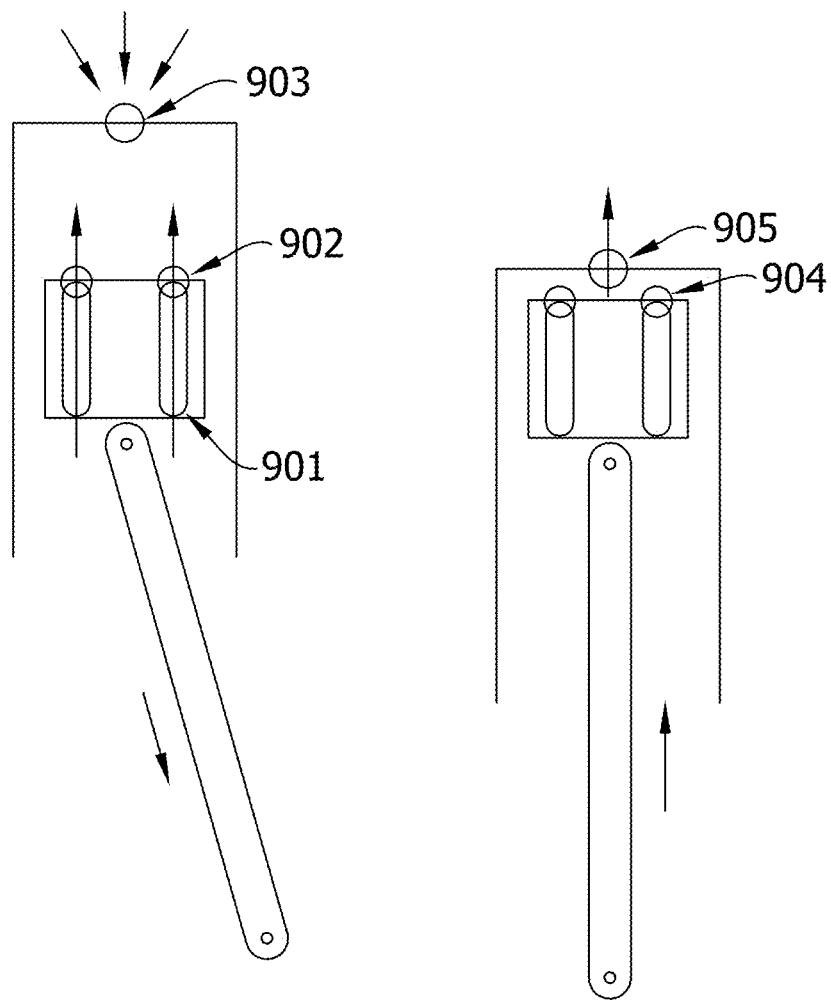
FIG. 9 is a schematic of the pistons and the hollow conduits of the drying device indicating the direction of air flow when in motion.

The pistons, which facilitate air flow in the drying device, are depicted in FIG. 8. An isolated piston (801) is depicted comprising a piston head (802) and a piston shaft (803). The piston head may further comprise a plurality of narrow conduits or holes (804) that facilitate air flow through the piston head. As a non-limiting example, FIG. 8 shows two conduits or holes in each piston head. When configured in the drying device the pistons are partially enclosed by a hollow conduit (805). The hollow conduit comprises an open end (806) and a covered end (807). The covered end which is proximal to the perimeter of the hollow tray comprises an opening which is covered by a moveable flap (808). The open end encases the piston head. In various embodiments, the narrow conduit(s) or hole(s) in the piston head may also comprise moveable flap(s) (809) facing inside the hollow conduit. Further, the piston shaft is operably connected to a stud protruding from the base of the drying device (shown as 503 and 603 of FIGS. 5 and 6 respectively). The piston head traverses the length of the hollow conduit via inward and outward strokes (e.g., during the rotation of the hollow tray). As shown in FIG. 9, when the piston is moved in an outward direction air flows through the narrow conduits (901), through the moveable flaps (902) and into the chamber of the hollow conduit. The partial vacuum created with the outward motion of the piston head keeps the moveable flap on the outside of the hollow conduit (903) closed. When the piston is moved inward (i.e., into the hollow conduit) it pushes air so that the moveable flaps on the piston head (904) are closed and the moveable flap on the outside of the hollow conduit (905) is dislodged, allowing air to flow into the hollow tray.

Figure 10:
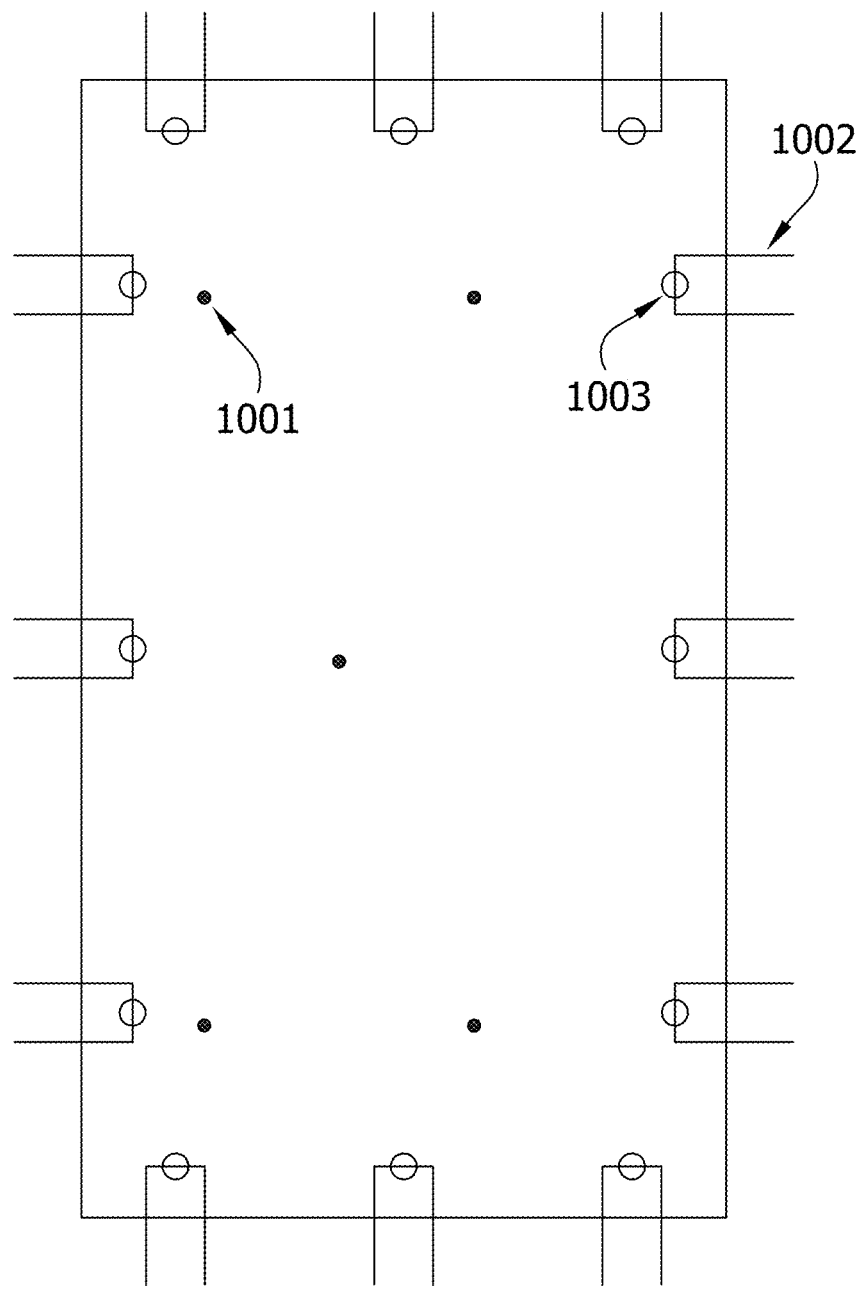
FIG. 10 is a schematic of the hollow tray from the underside with hollow conduits positioned around the perimeter and the stud positions connecting to the rotating discs indicated.
Figure 11:
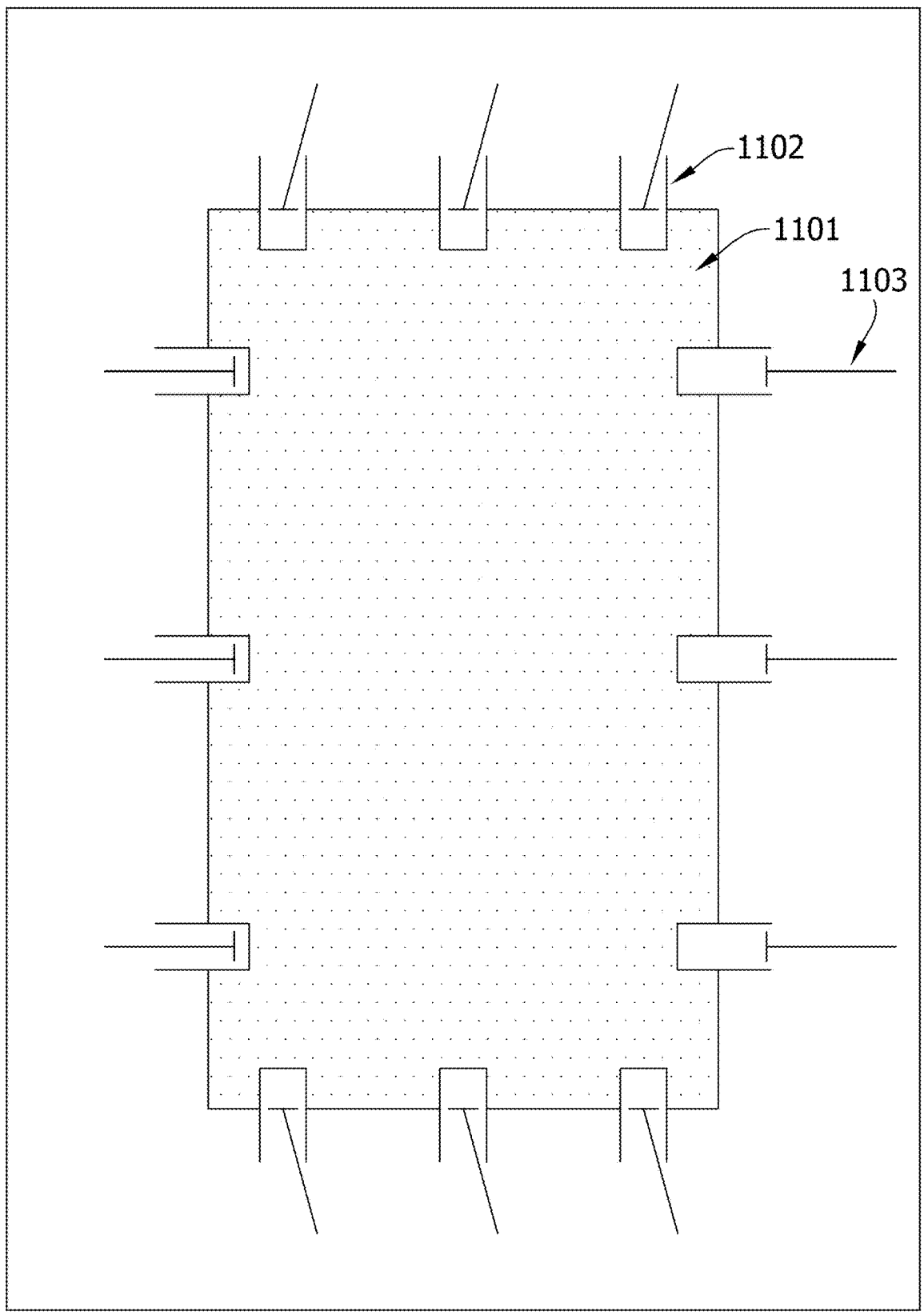
FIG. 11 is a schematic of the hollow tray from above showing the plurality of small holes on its surface as well as the hollow conduits enclosing pistons positioned around the perimeter.

FIG. 10 provides an additional illustration of the underside of the hollow tray. The dots (1001) represent vertical pins connecting to the rotating discs discussed above. Also shown are the hollow conduits (1002) surrounding the perimeter and the moveable flaps (1003) covering the partially closed end. FIG. 11 provides a further illustration of a view of the hollow tray looking upwards. In this figure, the plurality of small holes (1101) are visible. Also shown are the hollow conduits (1102) and pistons (1103) that are positioned around the perimeter of the hollow tray.

Accordingly, as depicted in the Figures as described herein, an object is placed upon the drying apparatus (e.g., on a stationary platform having small openings such as shown as 107 in FIG. 1). Through a motor driven system comprising a plurality of rotating wheels positioned under and operably connected to a hollow tray, the hollow tray is rotated. This rotation causes pistons to move in and out hollow conduits, directing air into the hollow cavity of the hollow tray. The air is then propelled through holes on the surface of the tray and up through the grating that comprises the stationary platform, thus drying the object.

As noted above, the stationary platform (e.g., 107 in FIG. 1) is configured to suspend an object to be dried over the rotating hollow tray. In various embodiments, the stationary platform may further comprise a carpet designed to direct air flow upwards and onto an object placed above it.

The drying device as described herein can be configured to effectively dry any objects that may fit on the stationary platform such as, but not limited to, articles of clothing (e.g., shoes, gloves) or animals (e.g., household pets like small dogs or cats).

Figure 12:
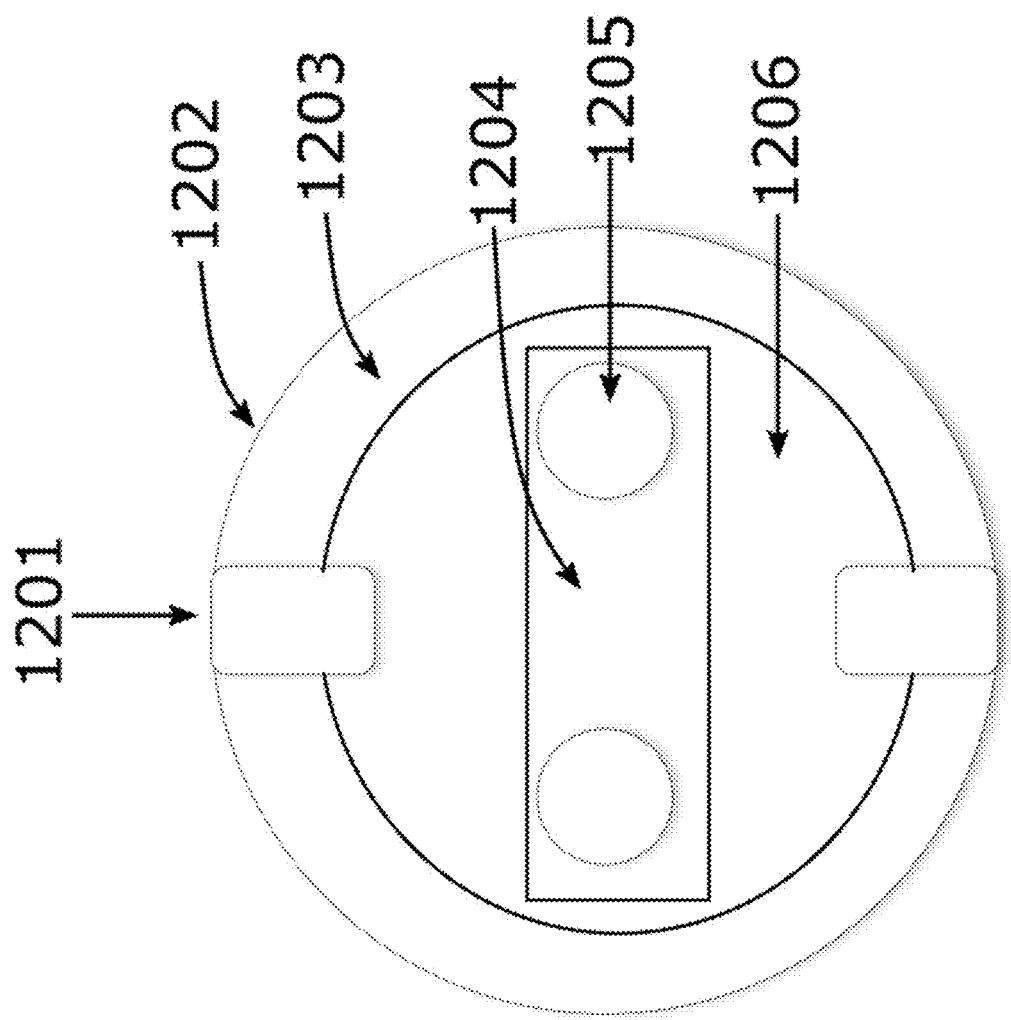
FIG. 12 is a schematic of the piston heads of the pistons and the hollow conduits of the drying device of FIGS. 8 and 9.

A piston head is depicted in FIG. 12. The piston head may further comprise a plurality of narrow conduits or holes (1205) in a piston head body (1206) within a cylinder case (1202) and joined by a rubber gasket (1203). Engagement (1201) is a protrusion in the cylinder and corresponding indentation in piston (1201) to prevent the piston from spinning. The narrow conduits or holes (1205) that facilitate air flow through the piston head. As a non-limiting example, FIG. 12 shows two conduits or holes in each piston head. In various embodiments, the narrow conduit(s) or hole(s) in the piston head may also comprise moveable flap(s) (1204) facing inside the hollow conduit. When the piston is moved inward (i.e., into the hollow conduit) it pushes air so that the moveable flaps (1204) on the piston head are closed and the moveable flap on the outside of the hollow conduit is dislodged, allowing air to flow into the hollow tray.

In the devices described herein, the tray may also include an enclosed fluid such as an oil/water mixture that is form or color changing for aesthetics.

Devices of the present invention also include a model toy. The product in description is related to model cars and toys that can be assembled and displayed. For example, in some instances, the parts would be provided in a kit with or without instructions for the buyer to assemble. The toy model could rotate at very low RPMs with little to minimal force. In some embodiments, these toy models versions would not even need to produce substantial air pressure, only to move and function as if it was performing work. The models could be configured to provide for sufficient air pressure to either levitate a floating ball, or mixing liquids of different colors and viscosities. These models could be powered by a battery or a small solar panel. These models would mostly be for visual novelty purposes or instruction/training.

Figure 13:
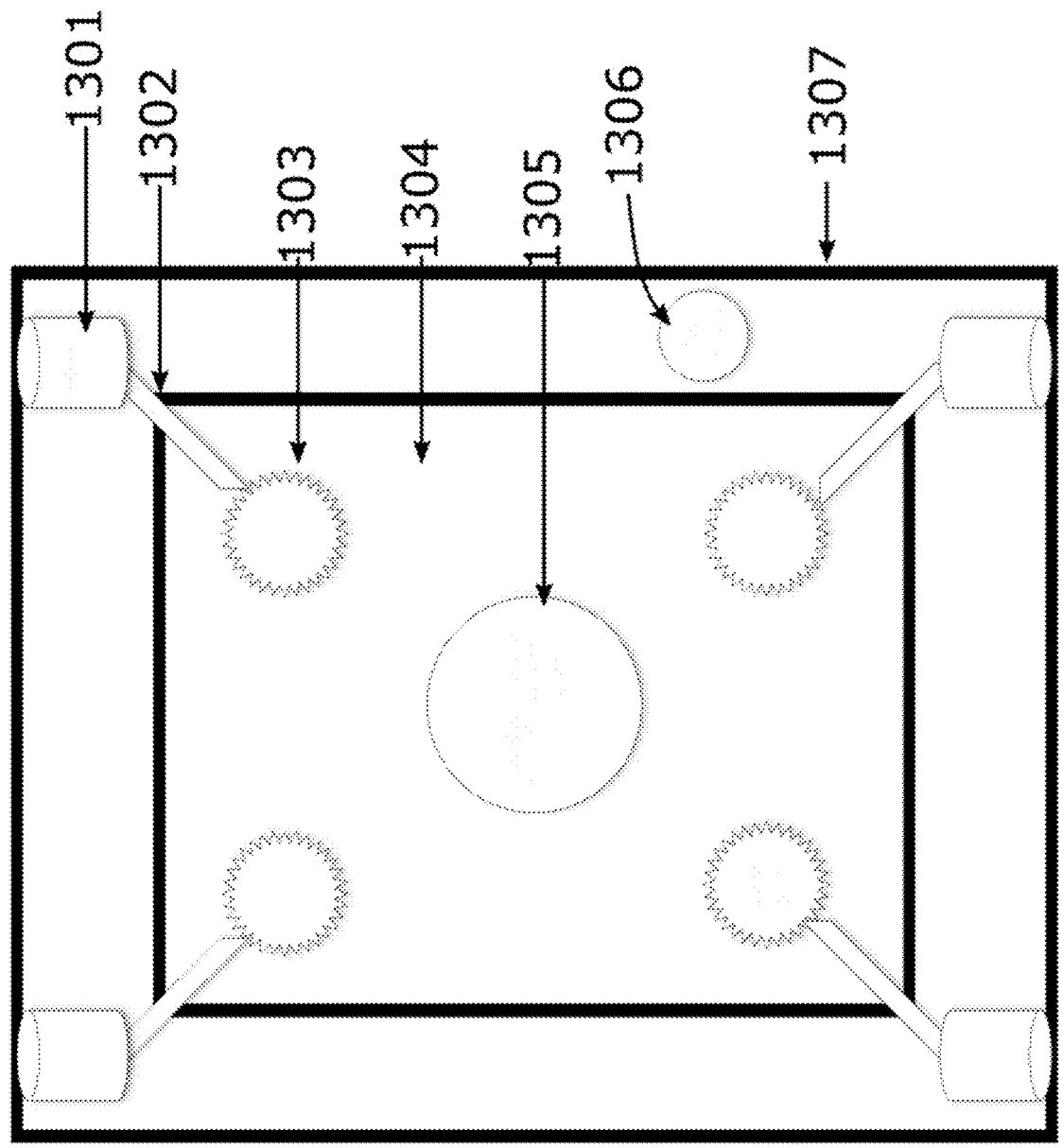
FIG. 13 is a schematic of a model toy according to an embodiment of the invention.

FIG. 13 provides an embodiment of the present disclosure of a model toy. In general, the device includes a case (1307) and a plurality of rotatable barrels (1301). The barrels (1301) may include an image such that the image rotates with the barrel (1301). The barrels (1301) are operably connected with drives (1302) operably connected to geared discs (1303) such that rotation of the geared discs (1303) drives rotation of the drives (1302) which drives rotation of the barrels (1301). The drive (1302) may project through a tray (1304) situated within the case (1307). Central rotating disc (1305) can be rotated via a belt or driveshaft (not shown, see for example 702 in FIG. 7) by a motor (1306). This motion oscillates the tray rotates geared discs (1303) which are connected to the tray (1304). In some embodiments, the model toy is provided to the end user in the form of a kit, which may be assembled into the model toy such as for educational or recreational purposes.

Devices of the present invention also include a clock. This device could be provided assembled or as a kit in pieces for the buyer to assemble. A functioning clock can be inserted into the center of the product. The device would rotate and display the functionality of the product, while also being a useful clock on display. Such clock would be suitable in, for example, garages, workshop areas, or "man cave" areas.

Figure 14:
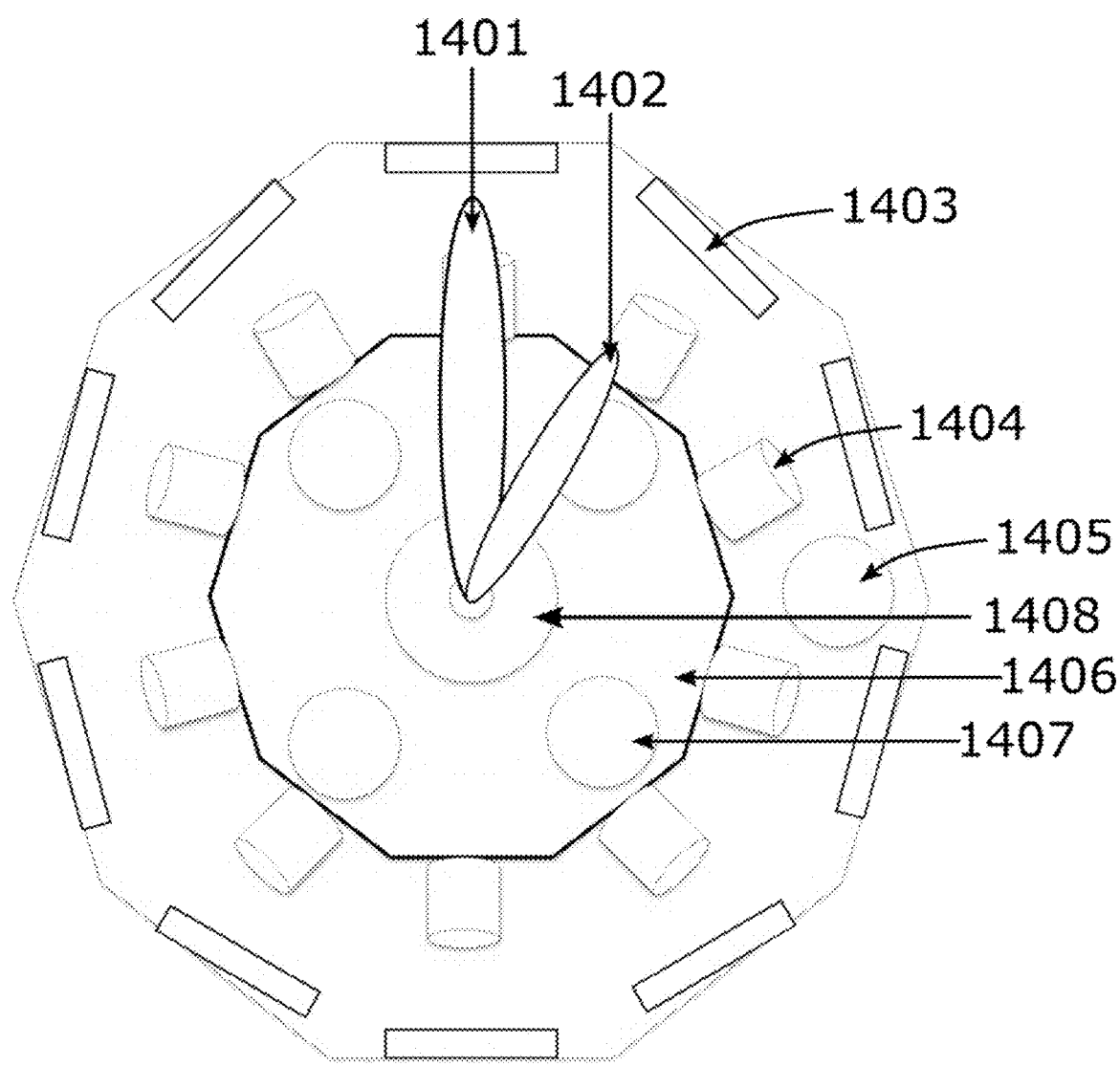
FIG. 14 is a schematic of a clock according to an embodiment of the invention.

FIG. 14 provides an additional embodiment of the present disclosure of a clock. The clock includes a body with time markings (1403) indicated a movable minute hand (1401) and hour hand (1402). In some embodiments, the hands may be driven by conventional means which may include a separate power unit. The body includes a solid tray (1406) within which are situated a plurality of discs (1407). Motor (1405) may be situated within the body and functionally connect to a central rotating disk (1408). The clock also includes a plurality of pistons (1404) The discs (1407) and pistons (1404) may be driven by means in accordance with the present disclosure and may be driven separately from those which drive the hands. The discs (1407, 1405) and pistons (1404) may be viewable through openings in the body. In some embodiments, the clock is provided to the end user in the form of a kit, which may be assembled into the clock such as for educational or recreational purposes.

Figure 15:
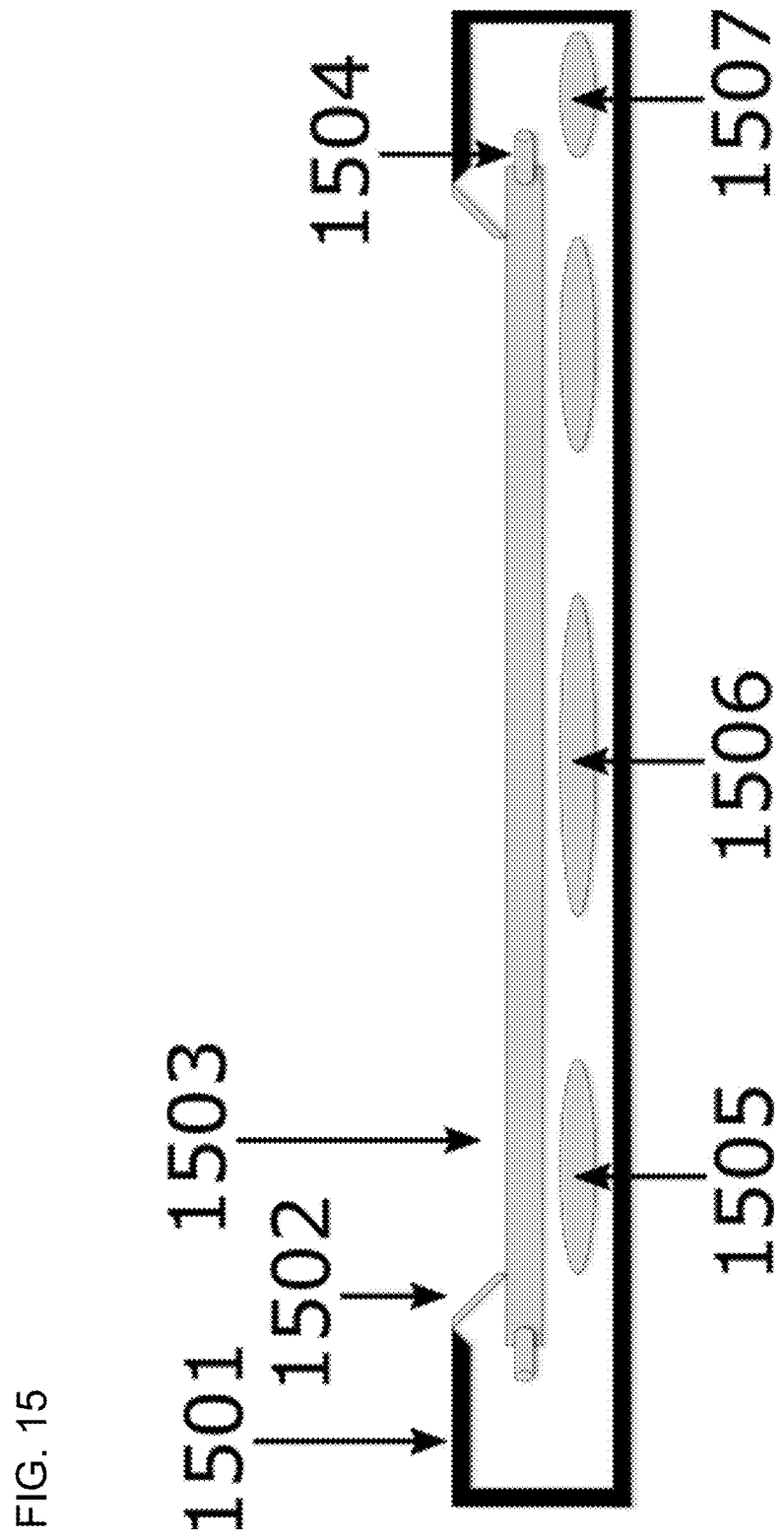
FIG. 15 is a schematic of a floor mat according to an embodiment of the invention.

FIG. 15 provides a cross-sectional view of an additional embodiment of the present disclosure of a floor mat (1500). The floor mat (1500) can comprise a housing (1501) which optionally may be structured to have a screened area (1502) configured to collect moisture and debris. In various embodiments, the floor mat (1500) may comprise rotatable discs or bearings (1505, 1506, 1507) positioned below a hollow tray (1503). The hollow tray (1503) is connected to hollow conduits (not shown) which house pistons (1504) that facilitate air flow. The hollow tray itself is suspended inside the housing and spaced from exterior walls to allow for sufficient room to rotate on a horizontal plane.

Figure 16:
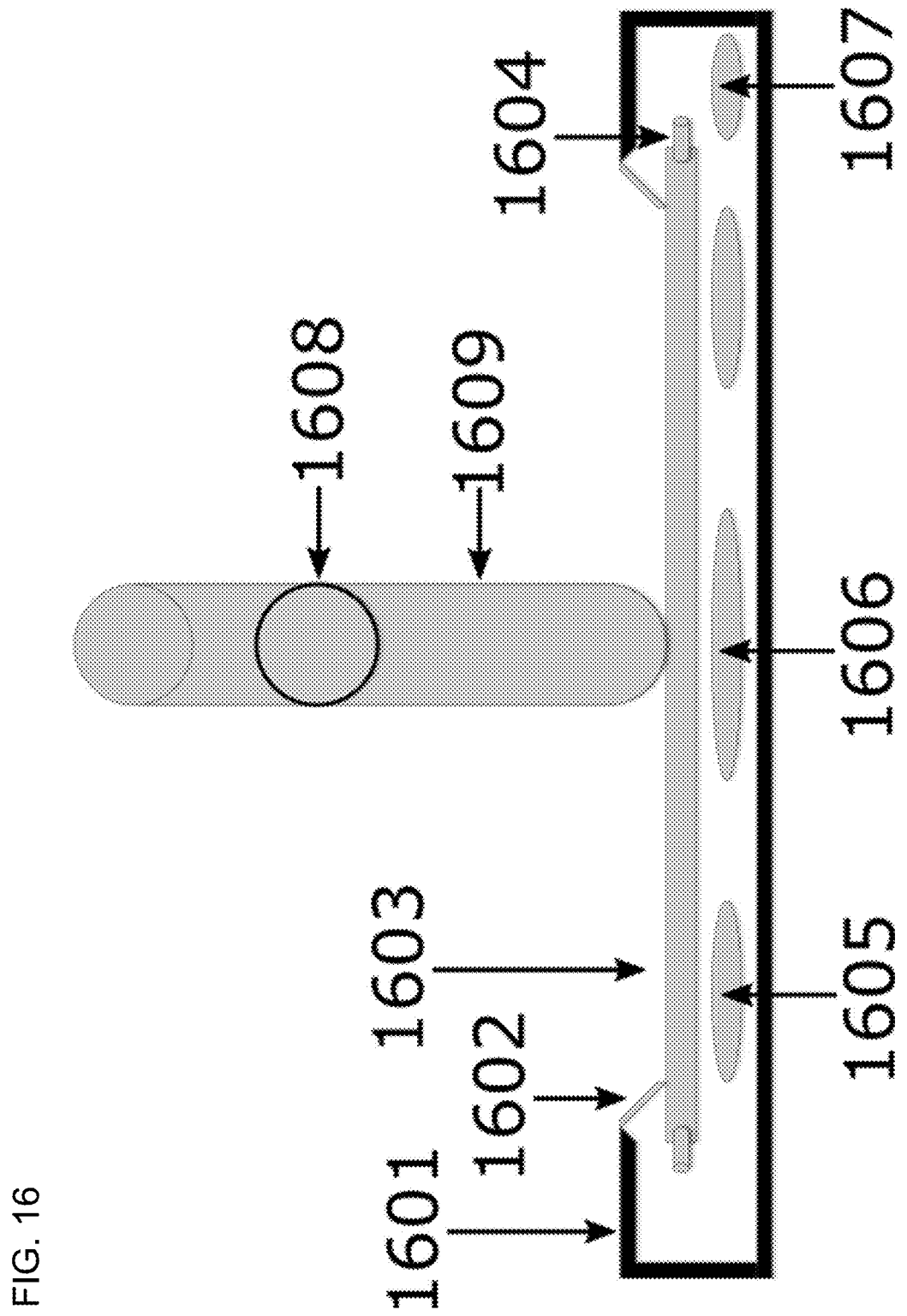
FIG. 16 is a schematic of a model ball toy according to an embodiment of the invention.

A further embodiment of the tray of FIG. 15 is illustrated in FIG. 16, which shows a model toy (1600) that floats or levitates a ball (1608) constrained within a tube (1609). The hollow tray (1603) provides air upwards into the tube (1609).

Devices of the present invention also include diffusers and aromatherapy devices. In these embodiment, the fan has no moving pistons around it's rotating tray but the rotating tray moves an array of vertical, stationary, but pivoting fan places that would be in the general area of the pistons in other options. The center tray could be saturated with fragrance oils. In some embodiments the tray comprises a sponge comprising fragrance oils.

Figure 17:
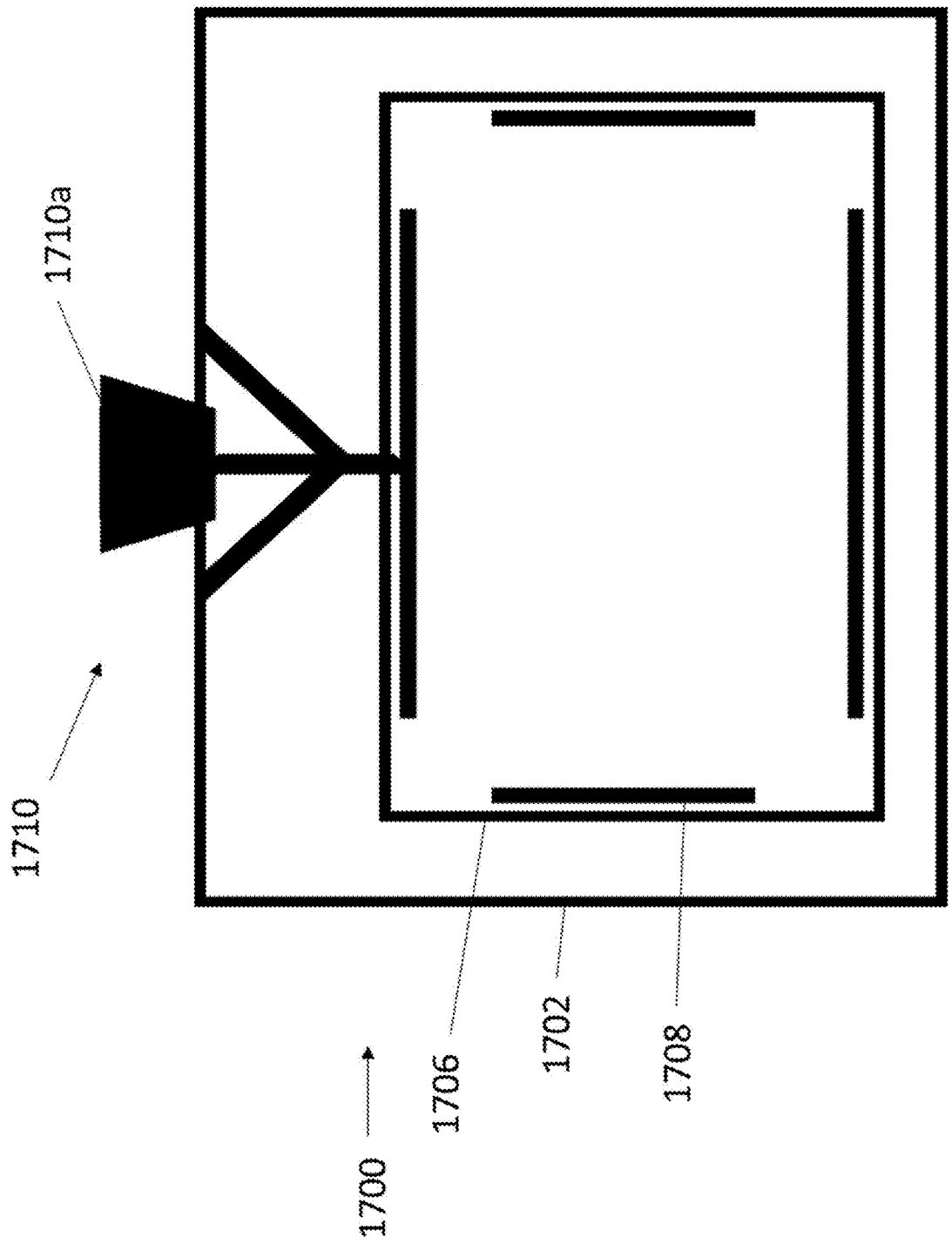
FIG. 17 is a schematic of an aromatherapy device according to an embodiment of the invention.

FIG. 17 provides an exemplary diffuser or aromatherapy device (1700). The illustrated embodiment does not include pistons, but the skilled person will envision that the device (1700) can include pistons if desired or necessary, as described in detail with regard to other embodiments of the present disclosure. In general, the device (1700) includes a body (1702). Housed within body (1702) is rotating tray (1706). In the illustrated embodiment, rotating tray (1706) is not hollow. In other embodiments, rotating tray (1706) is hollow, similar to embodiments described above.

Device (1700) also includes a fan (1710) coupled thereto. Fan (1710) includes at least one fan blade (1710*a*), for example, one fan blade, two fan blades, three fan blades, four fan blades, and so forth. Rotation of fan blades (1710*a*) facilitates rotation of rotating tray (1706). Fan (1710) can be connected to a power source. The power source can be an internal or external power source. In one embodiment, the power source is solar power. In another embodiment, the power source is a fuel cell.

Rotating tray (1706) can be any suitable shape, such as, for example, a square or rectangle. The perimeter of the rotating tray (1706) can have raised edges. In one embodiment, the entire perimeter edge of the rotating tray (1706) can be raised. In other embodiments, some portions of the perimeter edge of the rotating tray (1706) are raised, and other portions of the perimeter edge of the rotating tray (1706) are not raised. In this way, the raised perimeter edge portions help to facilitate rotation of the fan blade arm.

Device (1700) also includes a fan (1710) coupled thereto. Fan (1710) includes at least one fan blade (1710*a*), for example, one fan blade, two fan blades, three fan blades, four fan blades, and so forth. Fan blades (1710*a*) are generally stationary with regard to a central fan hub to which the fan blades (1710*a*) are coupled. Fan blades (1710*a*) extend outward from the fan hub and rotate around fan hub.

Rotation of fan blades (1710*a*) facilitates rotation of rotating tray (1706). Fan (1710) can be connected to a power source. The power source can be an internal or external power source. In one embodiment, the power source is solar power. In another embodiment, the power source is a fuel cell. In various embodiments, the rotating tray (1706) has an average rotation per minute (rpm) of from about 5 rpm to about 100 rpm, for example from about 5 rpm to about 75 rpm, from about 10 rpm to about 75 rpm, or from about 10 rpm to about 50 rpm.

Rotating tray (1706) can be any suitable shape, such as, for example, a square or rectangle. The perimeter of the rotating tray (1706) can have raised edges (1708). In one embodiment, the entire perimeter edge of the rotating tray (1706) can be raised. In other embodiments, some portions of the perimeter edge of the rotating tray (1706) are raised, and other portions of the perimeter edge of the rotating tray (1706) are not raised. In this way, the raised perimeter edge portions help to facilitate rotation of the fan blades (1710*a*), as the perimeter edge contacts fan blades (1710*a*).

Rotating tray (1706) can be dosed with a fragrance oil, such as a synthetic fragrance oil or an essential oil derived from natural products. Sufficient fragrance oil is generally placed on rotating tray (1706) such that a user can smell the fragrance oil when the fan (1710) is activated. In one embodiment, the rotating tray (1706) is substantially saturated with fragrance oil. The rotating tray (1706) can be removed from device (1700) to allow the user to re-saturate the rotating tray (1706) or to change the fragrance oil used.

In various embodiments, device (1700) is packaged in a pre-assembled fashion. In another embodiment, device (1700) is provided in kit form, such that the housing, tray, and/or fan are provided separately for assembly by the user. Instructions for assembly and use can also be provided therewith.

Devices of the present invention also include an engine. The engine could be configured as a two stroke gasoline powered engine. The device could also be configured as an air powered motor in a D.A. sander for automotive body work. Lubrication can be applied in the air intake or the fuel intake for either option.

The air intake and the exhaust can be in the same areas regardless of the configuration. One difference is that the two stroke engine device would need a valve system to lock and release air pressure on every other stoke or rotation of the center tray.

Figure 18:
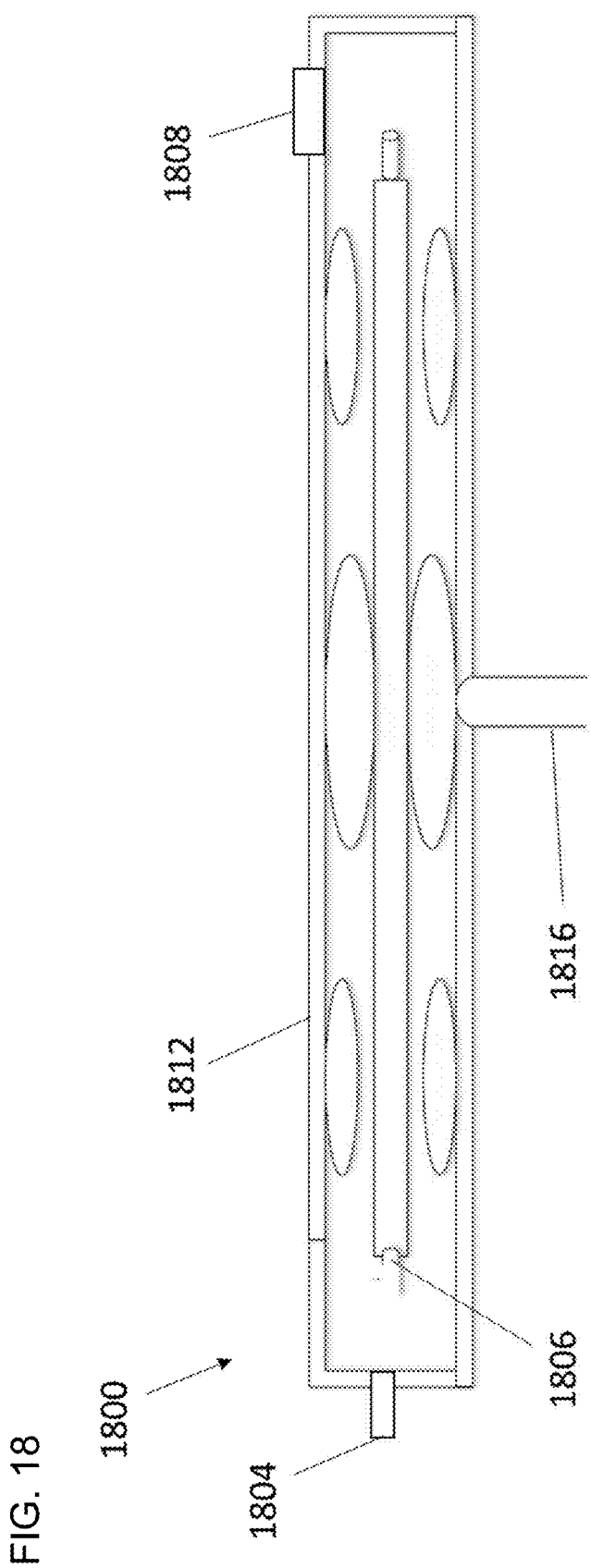
FIG. 18 is a schematic of an engine according to an embodiment of the invention.

Referring now to FIG. 18, an engine (1800) is also provided herein. Engine (1800) can be gasoline powered, air powered, or use any other acceptable source of power, as will be readily understood by the skilled person. In general, a gasoline powered engine (1800) lubricates the engine with the fuel, whereas an air powered engine (1800) is lubricated by the air intake. When an air powered engine is used, air can be provided as compressed air, carbon dioxide bottles, or any other acceptable method known in the art. In a preferred embodiment, engine (1800) is gasoline powered. Fuel is inserted into engine (1800) via fuel intake (1804). Fuel intake (1804) is coupled to piston (1806). Engine can include an air intake port (1808) through which air is allowed to enter engine (1800) and which can move the drive shaft (1816). Engine (1800) comprises crank case (1812). Crank case (1812) can define at least one exhaust port.

Engine (1800) can have a variety of start mechanisms. In one embodiment, the start mechanism comprises a pull rope/starter. A magnet and magnetic firing set can also be included on engine (1800). Energy produced by the engine (1800) is output through the drive shaft (1816) which is operatively coupled to engine (1800).

Engine (1800) can be a two-stroke engine. Alternatively, engine (1800) can be a four-stroke engine. Engine (1800) can be used for a variety of purposes, and can be used in the devices described in the present application as a power source. Engine (1800) can also be used in sanders, particularly sanders in automotive applications.

Figure 19:
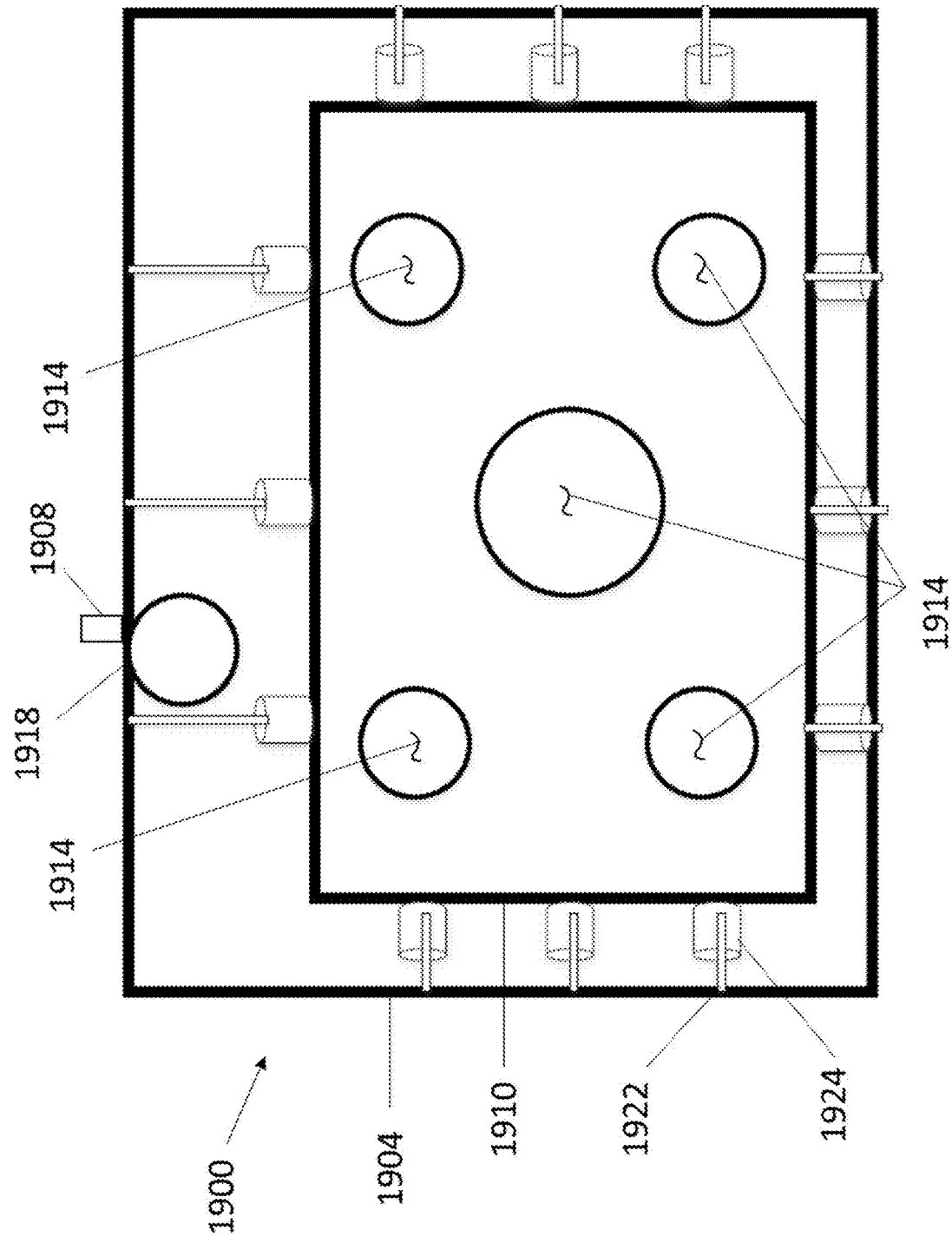
FIG. 19 is a schematic of a water sprinkler according to an embodiment of the invention.

Devices of the present invention also include water sprinkler devices. Referring now to FIG. 19, also provided herein is a water sprinkler (1900). Water sprinkler (1900) comprises a housing (1904). Housing (1904) comprises a water inlet (1908) located thereon. Water inlet (1908) can be connected to an external water source, such as a water hose or spigot. Alternatively, the water source is an internal water source, or the sprinkler (1900) recycles water in use so that a constant water source is not required. Typically, when the sprinkler (1900) recycles water, a power source is used, such as an internal or external power source. Preferably, the power source comprises an electric drive motor.

Housed within housing (1904) is a tray (1910). Tray (1910) can comprise a hollow tray, as described above with reference to other embodiments of the present invention. Tray (1910) defines a plurality of openings (1914). Openings (1914) can be ordered or random and of any suitable size and shape. Housing (1904) also encloses a paddle wheel or drive (1918). The intake of water rotates the paddle wheel (1918). The movement of the paddle wheel (1918) moves the water through housing (1904). Movement of the water moves a plurality of pistons (1922) partially enclosed in hollow conduits (1924) positioned around the perimeter of the tray (1910). The movement of the pistons (1922) facilitates water flow into the hollow tray (1924), as described above with regard to air flow through the hollow tray in separate embodiments. The water flow into hollow tray (1924) allows the release of water through openings (1914). This allows for a water spray from all openings (1914) at a variety of angles.

Having described the invention in detail, it will be apparent that modifications and variations are possible without departing from the scope of the invention defined in the appended claims.

EXAMPLES

The following non-limiting examples are provided to further illustrate the present invention.

Example 1

Fluid Supply System

The Fluid Supply System is a floor mat like device. It is 3 in. tall and 24 in. wide and 36 in. long. The usable surface of the system comes from a hollow tray with approximately 100 small holes on its upper surface. Along with 5 studs protruding from its underside, that fit into slots on the top side of 5 rotating discs below it. Above the hollow tray that is gyrating (rotating) on 5 rotating discs, is a specially designed type of indoor outdoor carpet. The carpet is the usable surface because air with pressurize inside the hollow tray and pass through its holes and then up through the carpet.

The five rotating discs have slots on each of its flat sides. The side of the discs facing down each have a slot in the center which pin to the bottom tray. Slots on the top side of the discs are offset 1 in. from the center which pin to the bottom of the hollow tray. This creates a 2 in. circular rotation of the hollow tray.

To produce air pressure inside of the hollow tray, the hollow tray has 12 hollow cylinders equally spaced around its perimeter. A single hole is at the closed end of each cylinder which passes through the hollow tray. Inside the hollow tray there are small rubber flaps that cover the holes that pass into the cylinders. This is so air can only flow in one direction, into the hollow tray.

The bottom tray has 12 studs sticking vertically up and equally spaced around its perimeter, which align with the hollow trays 12 cylinders. Each of the 12 studs has a single piston rod attached to it. The piston rods each have a piston head attached to the other end, which fit into the cylinders. This is the concept of a simple reciprocating pump. The piston heads each have a hole that passes through them with a rubber flap that hangs over the holes. This is to push air in one direction, into the hollow tray, and allows for air intake into the cylinders on the opposite stroke.

The system can be powered by a small electric motor with a drive wheel that is the same diameter of 4 of the rotating discs. The center rotating disc is driving by the electric motor via a belt of rubber band and is larger than the other discs. The electric motor turns the center disc, which in return rotates the hollow tray in a 2 in. circular motion. The pistons pivot side to side and then up and down as the rubber flaps covering their holes only allow air to flow in one direction—into the hollow tray and out the many holes on its upper surface. The air will pass through the carpet and make the fabrics sway and flap side to side. Objects placed on the useable surface of the system will dry.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The invention claimed is:

1. A device, comprising:
   (a) a hollow tray comprising an upper surface having a plurality of holes, a lower surface connected to a plurality of rotatable discs and having a perimeter and a center; wherein at least one disc is functionally connected to a motor configured to rotate the disc and, by extension, the hollow tray;
   (b) a plurality of hollow conduits spaced around the perimeter of the hollow tray, each conduit encasing a piston head connected to a piston rod secured to a bottom tray, the piston heads being freely moveable within the conduit and configured to push air through the hollow conduits and into the center of the hollow tray during rotation of the hollow tray;
   (c) a stationary platform having a plurality of holes positioned over the hollow tray; and
   (d) a housing that encases the components of (a) and (b) and suspends the stationary platform above the hollow tray.

2. The device of claim 1 wherein each hollow conduit comprises a partially closed end proximal to the perimeter and an open end encasing the piston head.

3. The device of claim 1 wherein each piston head traverses a length of the hollow conduit via inward and outward strokes during rotation of the hollow tray and wherein the piston heads further comprise holes that allow air to fill the hollow conduit during each outward stroke before the pistons push the air through the conduit on each inward stroke.

4. The device of claim 1 wherein the pistons of the hollow conduits are connected to the bottom tray via a plurality of perimeter studs.

5. The device of claim 1 wherein the rotating disc functionally connected to the motor is centered on the lower surface of the hollow tray.

6. The device of claim 5 wherein the motor comprises a rotor connected to the centered rotating disc, and wherein a diameter of the rotor is less than a diameter of the centered rotating disc.

7. The device of claim 1 wherein the stationary platform is configured to suspend an object to be dried over the rotating hollow tray.

8. The device of claim 7 wherein the stationary platform further comprises a carpet that facilitates air flow into the object.

9. The device of claim 1 wherein the housing further comprises a platform bordering the hollow tray that is, optionally, connected to the hollow tray via a grating where moisture and/or debris can be collected.

10. The device of claim 1 further comprising a fan.

11. The device of claim 1 further comprising a high-friction material that stabilizes an underside of the device and prevents the housing from moving when the hollow tray is in motion.

12. The device of claim 1 wherein the device is configured to dry an animal, article of clothing, or footwear.

13. The device of claim 12 wherein the animal is a household pet.

14. The device of claim 1 wherein the rotatable discs comprise a hole offset from center of the disc to receive a pin that connect to the hollow tray.

15. A device, comprising:
- a base comprising a central rotating disc that is functionally connected to a motor configured to rotate the disc, wherein the rotating disc is connected to the base by a vertical pin affixed to the base and positioned in the center of the central rotating disc;
- one or more rotatable discs connected to the base by a vertical pin and positioned in the center of the one or more rotatable discs;
- an upper tray comprising one or more upper rotating discs, wherein the one or more upper rotating discs are connected to the upper tray by a vertical pin affixed to the upper tray and positioned in the center of the disc; and
- a pin affixed to each of the one or more rotatable discs connected to the base and affixed to the one or more upper rotating discs connected to the upper tray, wherein the pin is positioned offset from center.

16. The device of claim 15, where a housing encases the base and upper tray.

* * * * *